United States Patent
Nguyen et al.

(10) Patent No.: US 10,920,558 B2
(45) Date of Patent: Feb. 16, 2021

(54) METHOD OF ENHANCING PROPPANT DISTRIBUTION AND WELL PRODUCTION

(71) Applicant: Halliburton Energy Services, Inc., Houston, TX (US)

(72) Inventors: Philip D. Nguyen, Houston, TX (US); Janette Cortez Montalvo, Porter, TX (US); Leopoldo Sierra, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/510,663

(22) Filed: Jul. 12, 2019

(65) Prior Publication Data

US 2021/0010360 A1    Jan. 14, 2021

(51) Int. Cl.
*E21B 43/267* (2006.01)
*C09K 8/80* (2006.01)

(52) U.S. Cl.
CPC .............. *E21B 43/267* (2013.01); *C09K 8/80* (2013.01)

(58) Field of Classification Search
None
See application file for complete search history.

(56) References Cited

U.S. PATENT DOCUMENTS

| | | | |
|---|---|---|---|
| 3,126,056 A | 3/1964 | Harrell | |
| 3,127,937 A | 4/1964 | McGuire et al. | |
| 3,155,159 A | 11/1964 | McGuire et al. | |
| 3,224,506 A | 12/1965 | Huitt et al. | |
| 4,078,609 A | 3/1978 | Pavlich | |
| 4,887,670 A | 12/1989 | Lord et al. | |
| 5,159,979 A | 11/1992 | Jennings, Jr. | |
| 5,425,421 A | 6/1995 | Coleman et al. | |

(Continued)

FOREIGN PATENT DOCUMENTS

| WO | 2017-052522 A1 | 3/2017 |
|---|---|---|
| WO | 2018-084837 A1 | 5/2018 |

OTHER PUBLICATIONS

International Search Report and Written Opinion dated Sep. 3, 2020; International PCT Application No. PCT/US2020/034372.

(Continued)

*Primary Examiner* — Andrew Sue-Ako
(74) *Attorney, Agent, or Firm* — McGuireWoods, LLP (57) ABSTRACT

A variety of systems, methods, and compositions are disclosed, including, a method for treating a subterranean formation, the method comprising: injecting a pad fluid into the subterranean formation at a pressure sufficient to create at least one fracture in the subterranean formation; injecting a first treatment fluid into the at least one fracture, wherein the first treatment fluid comprises: an aqueous base fluid, and a first proppant particulate; allowing the first proppant particulate to gravitationally migrate into a portion of the at least one fracture; injecting a second treatment fluid into the at least one fracture, wherein the second treatment fluid comprises: a suspension base fluid comprising a viscosity of about 50 cP to about 10,000 cP, and a second proppant particulate; and allowing the fracture to close, thereby forming a full proppant pack and a partial proppant pack in the at least one fracture.

19 Claims, 4 Drawing Sheets

(56) References Cited

U.S. PATENT DOCUMENTS

| | | | |
|---|---|---|---|
| 6,330,916 B1 * | 12/2001 | Rickards | C09K 8/685 |
| | | | 166/280.2 |
| 6,776,235 B1 | 8/2004 | England | |
| 6,860,328 B2 | 3/2005 | Gonzalez et al. | |
| 7,281,581 B2 | 10/2007 | Nguyen et al. | |
| 7,581,590 B2 | 9/2009 | Lesko et al. | |
| 7,918,277 B2 | 4/2011 | Brannon et al. | |
| 7,931,084 B2 | 4/2011 | Nguyen et al. | |
| 8,066,068 B2 | 11/2011 | Lesko et al. | |
| 8,936,083 B2 * | 1/2015 | Nguyen | E21B 43/267 |
| | | | 166/278 |
| 9,102,867 B2 | 8/2015 | Parse et al. | |
| 2004/0206497 A1 | 10/2004 | Gonzalez et al. | |
| 2008/0149329 A1 | 6/2008 | Cooper et al. | |
| 2010/0181073 A1 | 7/2010 | Dupriest et al. | |
| 2011/0036571 A1 | 2/2011 | Vitalievich et al. | |
| 2011/0120719 A1 | 5/2011 | Soane et al. | |
| 2012/0247765 A1 | 10/2012 | Agrawal et al. | |
| 2012/0305247 A1 | 12/2012 | Chen et al. | |
| 2013/0048282 A1 | 2/2013 | Adams et al. | |
| 2013/0105157 A1 | 5/2013 | Barmatov et al. | |
| 2013/0126158 A1 | 5/2013 | Gupta et al. | |
| 2014/0060826 A1 | 3/2014 | Nguyen | |
| 2014/0262231 A1 | 9/2014 | Alam et al. | |
| 2014/0290943 A1 | 10/2014 | Ladva et al. | |
| 2014/0299318 A1 | 10/2014 | Crews et al. | |
| 2014/0367100 A1 * | 12/2014 | Oliveira | C09K 8/80 |
| | | | 166/280.1 |
| 2015/0129211 A1 | 5/2015 | Dusseault et al. | |
| 2015/0299560 A1 | 10/2015 | Robl et al. | |
| 2016/0312108 A1 | 10/2016 | Lestz et al. | |
| 2017/0051599 A1 | 2/2017 | Bestaoui-Spurr et al. | |
| 2017/0321112 A1 | 11/2017 | Lecerf et al. | |
| 2018/0030333 A1 | 2/2018 | Nguyen et al. | |
| 2018/0051203 A1 * | 2/2018 | Nguyen | C09K 8/80 |
| 2018/0066179 A1 | 3/2018 | Nguyen et al. | |
| 2019/0186248 A1 * | 6/2019 | Sherman | C09K 8/805 |
| 2019/0300778 A1 * | 10/2019 | Nguyen | E21B 43/267 |

OTHER PUBLICATIONS

Society of Petroleum Engineers (SPE), SPE 49104, Waterfracs—Results from 50 Cotton Valley Wells, pp. 489-496, 1998.
Society of Petroleum Engineers (SPE), SPE 168996, Development and Field Applications of Highly Conductive Proppant-free Channel Fracturing Method, pp. 1-16, 2014.
Society of Petroleum Engineers (SPE), SPE 171221-MS, Use of Channel Fracturing Technology Increases Production and Reduces Risks in Horizontal Wellbore Completions. First Experience in Russia, South-Priobskoe Oil Field, pp. 1-14, 2014.
International Search Report and Written Opinion in PCT/US2015/025178, dated Dec. 1, 2015.
Cortez, et al. "Enhancing Stimulated Reservoir Volume in Shale Reservoirs with Ultrafine Particles: A Laboratory Study", Hydraulic Fracturing Journal, vol. 5, No. 1, pp. 69-76, Jan. 2018.
Society of Petroleum Engineers (SPE), SPE 1291-G, Effect of a Partial Monolayer of Propping Agent on Fracture Flow capacity, AIME Petroleum Transactions, vol. 219, 1960, pp. 30-37.
Office Action issued in U.S. Appl. No. 15/554,202, dated May 14, 2019.
International Search Report and Written Opinion dated Mar. 2, 2016 in PCT/US2020/034372.
Office Action issued in U.S. Appl. No. 15/560,263, dated Jul. 2, 2018.
Office Action issued in U.S. Appl. No. 15/560,263, dated Feb. 25, 2019.
Office Action issued in U.S. Appl. No. 15/560,263, dated Jun. 14, 2019.
Office Action issued in U.S. Appl. No. 15/560,263, dated Jan. 8, 2020.
Society of Petroleum Engineers (SPE), SPE-110451-PA, Successful Hybrid Slickwater-Fracture Design Evolution: An East Texas Cotton Valley Taylor Case History, pp. 415-423, Aug. 2009.
Society of Petroleum Engineers (SPE), SPE 177004-MS—Modified Hybrid Fracturing in Shale Stimulation: Experiments and Application, Nov. 2015, pp. 1-11.
Society of Petroleum Engineers (SPE), SPE 106089, Extrapolation of Laboratory Proppant Placement Behavior to the field in Slickwater Fracturing Applications, pp. 1-12, 2007.
Society of Petroleum Engineers (SPE), SPE 114173, Stimulating Unconventional Reservoirs: Maximizing Network Growth while Optimizing Fracture Conductivity, pp. 1-19, 2008.
Society of Petroleum Engineers (SPE), SPE 119350, Stress Amplification and Arch Dimensions in Proppant Beds Deposited by Waterfracs, pp. 1-17, 2009.
Society of Petroleum Engineers (SPE), SPE 119368, The Effect of Proppant Distribution and Un-Propped Fracture Conductivity on Well Performance in Unconventional Gas Reservoirs, pp. 1-10, 2009.
Society of Petroleum Engineers (SPE), SPE 163833-MS—Production Forecasting of Hydraulically Fractured Conventional Low-Permeability and Unconventional Reservoirs Linking the More Detailed Fracture and Reservoir Parameters. pp. 1-21, Feb. 2013.
Society of Petroleum Engineers (SPE), SPE 96848-MS, High-Porosity Fractures Yield High Conductivity, Oct. 2005, pp. 1-10.
Society of Petroleum Engineers (SPE), SPE 115769-MS, The Relationship Between Fracture Complexity, Reservoir Properties, and Fracture Treatment Design, 2008, pp. 1-25.
Society of Petroleum Engineers (SPE), SPE 173380-PA, Use of a CO2-Hybrid Fracturing Design to Enhance Production From Unpropped-Fracture Networks, SPE Production & Operations, Feb. 2017, pp. 28-40.
Society of Petroleum Engineers (SPE), SPE 171594-MS, Quantification of Proppant Distribution Effect on Well Productivity and Recovery Factor of Hydraulically Fractured Unconventional Reservoirs, pp. 1-15, 2014.
Society of Petroleum Engineers (SPE), SPE 184852-PA, A Model for the Conductivity and Compliance of Unpropped and Natural Fractures, SPE Journal, Dec. 2017, pp. 1893-1914.
Society of Petroleum Engineers (SPE), SPE 168813/URTeC 1581809—A Production Optimization Approach to Completion and Fracture Spacing Optimization for Unconventional Shale Oil Exploitation, Aug. 2013, pp. 1-12.

* cited by examiner

METHOD OF ENHANCING PROPPANT DISTRIBUTION AND WELL PRODUCTION

BACKGROUND

Hydrocarbon-producing wells are often stimulated by hydraulic fracturing operations. In hydraulic fracturing, a fracturing fluid is pumped at an elevated pressure from a wellbore into adjacent hydrocarbon-bearing subterranean formations. The pumped fracturing fluid splits or "fractures" the rock formation along veins or planes extending laterally from the wellbore. In some applications, the fracturing fluid contains propping agents (alternately referred to as "proppant") that are also injected into the opened fractures. Once a desired fracture network is formed, the fluid flow is reversed and the liquid portion of the fracturing fluid is removed. The proppant is left behind to prevent the fractures from closing onto themselves due to the weight and stresses within the formation. Accordingly, the proppant "props" or supports the fractures to remain open, yet remains permeable to hydrocarbon fluid flow since they form a packed bed of particles with interstitial void space connectivity.

BRIEF DESCRIPTION OF THE DRAWINGS

These drawings illustrate certain aspects of some of the present disclosure, and should not be used to limit or define the disclosure.

DETAILED DESCRIPTION

The compositions, methods, and/or systems disclosed herein may relate to subterranean operations and, in some compositions, methods, and/or systems, to introduction of a treatment fluid into a subterranean formation penetrated by a wellbore. Any suitable treatment fluid for a given application may be used and should not be limited herein. Suitable treatment fluids may include, but are not limited to, a pad fluid, a fracturing fluid, a post-flush fluid, and/or any combination thereof. The formation treatment may be performed in an initial fracturing operation, or during a re-fracturing operation after an initial fracturing operation has been performed on the subterranean zone.

The treatment fluid may comprise a base fluid. Any suitable base fluid may be used and should not be limited herein. Suitable base fluids may comprise an aqueous base fluid, a non-aqueous base fluid, and/or any combination thereof. Examples of suitable aqueous base fluids may include fresh water, saltwater, brine, seawater, and/or any other aqueous base fluid that may not undesirably interact with the other components used in accordance with the present disclosure or with the subterranean formation. Examples of suitable non-aqueous base fluids may include organic liquids, such as hydrocarbons (e.g., kerosene, xylene, toluene, or diesel), oils (e.g., mineral oils or synthetic oils), esters, and/or any combination thereof.

In certain embodiments, a small concentration of a friction reducing polymer may be added to the aqueous base fluid thereby providing a slick-water base fluid. The friction reducing polymer may be any suitable polymer and should not be limited herein. Suitable friction reducing polymers may comprise a synthetic polymer, an anionic polymer, a cationic polymer, the like, and/or any combination thereof. By way of example, suitable synthetic polymers may include any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl fomamide, itaconic acid, methacrylic acid, acrylic acid esters, methacrylic acid esters, the like, and/or any combinations thereof. Without limitation, the friction reducing polymer may be included in the treatment fluid to provide a desired amount of friction reduction. For example, the friction reducing polymer may be included in the treatment fluid, for example, in an amount equal to or less than 0.2% by weight of an aqueous-based fluid present in the treatment fluid. Without limitation, the friction reducing polymer may be included in the treatment fluid in an amount sufficient to reduce friction without gel formation upon mixing. By way of example, the treatment fluid including the friction reducing polymer may not exhibit an apparent yield point.

Slick-water base fluids may have any suitable viscosity for a given application and should not be limited herein. Slick-water base fluids may comprise a viscosity of about 1 cP to about 20 cP, or about 1 cP to about 5 cP, or about 5 cP to about 20 cP, and/or any value or range of values therein. In certain embodiments, slick-water base fluid may comprise a density of about 1.0 g/cc to about 1.1 g/cc, or about 1.1 g/cc to about 1.3 g/cc, or about 1.3 g/cc to about 1.5 g/cc, and/or any value or range of values therein. Slick-water base fluids may be used in any suitable treatment fluid and should not be limited herein.

In certain embodiments, additives may be included in the based fluid so as to provide a suspension base fluid. As used herein, a "suspension base fluid" may refer to a base fluid capable of suspending proppants and non-degradable particulates such that the proppants and the non-degradable particulates may not gravitationally migrate into a portion of the fracture upon introduction. As used herein, "gravitationally migrate" may refer to the movement of a substance due to the influence of gravity. Any suitable suspension base fluid may be used and should not be limited herein. Suitable suspension base fluids may include, but are not limited to, gelled fluids, cross-linked fluids, foamed fluids, viscoelastic surfactant fluids, the like and/or any combinations thereof. Suitable suspension base fluids may comprise a viscosity of about 20 cP to about 100 cP, or about 100 cP to about 200 cP, or about 200 cP to about 10,000 cP, and/or any value or range of values therein. Suspension base fluids may comprise a density of about 0.05 g/cc to about 0.50 g/cc, or about 0.75 g/cc to about 1.10 g/cc, or about 1.20 g/cc to about 1.50 g/cc, and/or any value or range of values therein. Any suitable suspension base fluid may be used and should not be limited herein.

In certain embodiments, a suspension base fluid may comprise a gelling agent including, but not limited to, polyacrylamides, polysaccharides, celluloses, xanthan, diutans, and combinations thereof. The gels may be present in any amount suitable to form a gel with desired properties. In particular, a gel loading of about 50 lbs/Mgal (about 6,000 kg per 1000 cubic meters) or less. Additionally, the base fluid may be an aqueous gel comprising an aqueous fluid, a gelling agent for gelling the aqueous fluid and increasing its viscosity, and, optionally, a crosslinking agent for crosslinking the gel and further increasing the viscosity of the fluid. The increased viscosity of the gelled, or gelled and crosslinked, treatment fluid, inter alia, may reduce fluid loss and may allow the carrier fluid transport significant quantities of suspended particulates. The density of the carrier fluid may be increased to provide additional particle transport and suspension in some applications.

Treatment fluids may further comprise proppant particulates. In certain embodiments, the proppant particulates may be a micro-proppant particulate. As used herein, the term "micro-proppant particulate" may refer to proppant particulate having a $D_v50$ particle size ranging from about 0.001 microns to about 100 microns. The micro-proppant may have a $D_v50$ particles size from about 0.01 microns to about 100 microns, or about 0.1 microns to about 20 microns, or about 20 microns to about 40 microns, or about 40 microns to about 60 microns, or about 60 microns to about 80 microns, or about 80 microns to about 100 microns, or any value or range of values therein. The $D_v50$ particle size may also be referred to as the median particle size by volume of a particulate material. The $D_v50$ particle size may be defined as the maximum particle diameter below which 50% of the material volume exists. The $D_v50$ particle size values for a particular sample may be measured by commercially available particle size analyzers and should not be limited herein. Additionally, small sized proppant particulates may also be used in conjunction with, or in the place of micro-proppant particulates. As used herein, the term "small-sized proppant particulate" may refer to proppant particulates with a $D_v50$ particle size ranging from about 100 microns to about 500 microns, or any value or range of values therein. Proppant particulates may comprise any suitable density for a given application. Suitable proppant particulate specific gravities may include, but are not limited to, about 0.9 to about 2.0, or about 2.0 to about 2.65, or about 2.65 to about 3.5, and/or any value or range of values therein.

Proppant particulates may comprise any suitable material. Suitable materials for proppant particulates may include, but are not limited to, sand, white sand, brown sand, low-quality sand, local sand, dune sand, beach sand, bauxite, ceramic materials, glass materials, polymer materials, polytetrafluoroethylene materials, nut shell pieces, cured resinous particulates including nut shell pieces, seed shell pieces, cured resinous particulates including fruit pit pieces, wood, composite particulates, and combinations thereof. Suitable composite particulates may include a binder and a filler material wherein suitable filler materials include silica, alumina, fumed carbon, carbon black, graphite, mica, titanium dioxide, meta-silicate, calcium silicate, kaolin, talc, zirconia, boron fly ash, hollow glass microspheres, solid glass, and/or any combinations thereof. Without limitation, the proppant particulates may include graded sand. Other proppant particulates that may be suitable for use in subterranean applications may also be useful. The proppant particulates may be transported to the fracture by the base fluid. In certain embodiments, more than one proppant particulate may be transported to the fracture. In certain embodiments, the proppant particulates used in a given application may be different proppant particulates, the same proppant particulates, and/or any combinations thereof.

In certain embodiments, proppant particulates may be selected for use based on crush strength. Proppant particulates may have any suitable crush strength for a given application and should not be limited herein. In certain embodiments, a low-quality proppant particulates may be selected for use. Suitable low-quality proppant particulates may have a crush strength of about 100 psi to about 2,000 psi, or about 100 psi to about 1,000 psi, or about 1,000 psi to about 2,000 psi, and/or any value or range of values therein. Low-quality proppant particulates may have any suitable density, including, but not limited to, about 0.9 g/cc to about 1.1 g/cc, or about 1.25 g/cc to about 1.8 g/cc, or about 2.0 g/cc to about 2.65 g/cc, and/or any value or range of values therein. In certain embodiments, a high-quality proppant particulates may be selected for use. Suitable high quality proppant particulates may have a crush strength of about 2,000 psi to about 5,000 psi, or about 5,000 psi to about 10,000 psi, or about 10,000 psi to about 20,000 psi, and/or any value or range of values therein. High-quality proppant particulates may have any suitable density, including, but not limited to, about 2.5 g/cc to about 4.0 g/cc, or about 2.5 g/cc to about 3.0 g/cc, or about 3.2 g/cc to about 4.0 g/cc, and/or any value or range of values therein. In certain embodiments, a combination of low-quality proppant particulates and high-quality proppant particulates may be selected for use in a given application.

In certain embodiments, treatment fluids may further comprise a bridging agent. Bridging agents may comprise a non-degradable particulate. Any suitable non-degradable particulate may be used and should not be limited herein. Non-degradable particulates may have any suitable shape and should not be limited herein. The non-degradable particulates may have any suitable shape, for example, the particulates may be at least one of platelets, shavings, flakes, ribbons, rods, strips, spheroids, toroids, pellets, tablets, the like, and/or any combination thereof. Non-degradable particulates may have any suitable size distribution and should not be limited herein. Suitable size distributions may include but are not limited to about 0.1 mm to about 1 mm, or about 1 mm to about 3 mm, or about 3 mm to about 1 mm, and/or any value or range of values therein. In certain embodiments, suitable size distributions may include but are not limited to a ratio of length of the non-degradable particulates to the width of the non-degradable particulates (or a ratio of length to diameter) of about 1:1, or about 2:1, or about 3:1, or about 5:1, or about 10:1, and/or any value or range of values therein.

As used herein, "non-degradable particulates" may refer to any particulate that does not degrade within subterranean formation conditions at all or that does not degrade within subterranean formation conditions over a prolonged period of time (e.g., they may degrade only after the useful life of the formation) or upon prolonged contact with any fluids or components used in the formation. Any suitable non-degradable particulate may be used. Suitable non-degradable particulates may include, but are not limited to, polyamide 6 (Nylon 6), polyamide 66 (Nylon 6/6), acrylic, acrylonitrile butadiene styrene (ABS), ethylene vinyl alcohol, polycarbonate/PET polyester blend, polyethylene terephthalate (PET), unreinforced polycarbonate/polybutylene terephthalate (PC/PBT) blend, PETG copolyester, polyetherimide, polyphenylene ether, molded polyphenylene sulfide (PPS), heat resistant grade polystyrene, polyvinylbenzene, acrylonitrile-butadiene-styrene, polyvinylchloride, fluoroplastics, polysulfide, polypropylene, styrene acrylonitrile, polystyrene, phenylene oxide, polyolefins, polystyrene divinylbenzene, polyfluorocarbons, polyethers etherketones, polyamide imides, and combinations thereof. Some other well-suited high density plastic materials include oil-resistant thermoset resins such as acrylic-based resins, epoxy-based resins, furan-based resins, phenolic-based resins, phenol/phenol formaldehyde/furfuyl alcohol resins, polyester resins, and/or combinations thereof.

In certain embodiments, the treatment fluids may further comprise additional additives. Suitable additional additives may include, but are not limited to, clay stabilizers, oxygen scavengers, corrosion inhibitors, scale inhibitors, iron control agents, foaming agents, antifoam agents, dispersants, viscosifiers, weighting agents, wetting agents, coating enhancement agents, and the like, or any other additive that does not adversely affect the fluid. Additional additives may be present in the fluids in any suitable amount for a given application and should not be limited herein.

Methods of the present disclosure may include forming a fracture network in a subterranean formation or portion thereof by introducing a pad fluid at a pressure and/or rate sufficient to create and/or extend the fracture network. One skilled in the art, with the benefit of the present disclosure, may recognize the pressures and/or rates needed to create and/or extend the fracture network, which may depend on the fluid properties like viscosity, the formation properties like hardness and brittleness, and the like. Any suitable pad fluid may be used and should not be limited herein. In certain embodiments, the pad fluid may be solids free or substantially solids free. As used herein, "solids free" and/or "substantially solids free" may refer to a treatment fluid comprising solid particulates in an amount of about 1 wt. % by weight of treatment fluid or less. In certain embodiments, the pad fluid may comprise proppant particulates. Any suitable proppant particulates in any suitable amount may be used and should not be limited herein. The pad fluid may comprise a high viscosity pad fluid, a low viscosity pad fluid, and/or any combination thereof.

In certain embodiments, a high viscosity pad fluid may be introduced into the wellbore at a pressure sufficient to create and/or extend the fracture network. In certain embodiments, a high viscosity pad fluid may have a viscosity of about 50 cP to about 3,000 cP, or about 50 cP to about 1,000 cP, or about 1,000 cP to about 3,000 cP, and/or any value or range of values therein. Optionally, the pad fluid may further comprise micro-proppant particulates. Any suitable amount of proppant particulates may be included and should not be limited herein. The high viscosity pad fluid may comprise proppant particulates in an amount of about 0.1 ppg to about 0.25 ppg, or about 0.3 ppg to about 1.0 ppg, or about 1.5 ppg to about 3.0 ppg, and/or any value or range of values therein.

In certain embodiments, a low viscosity pad fluid may be introduced into the wellbore at a rate sufficient to dilate and/or generate microfractures along the fracture length and perpendicular to the fracture. In certain embodiments, a low viscosity pad fluid may have a viscosity of about 0.5 cP to about 1 cP, or about 1 cP to about 5 cP, or about 5 cP to about 20 cP, and/or any value or range of values therein. The low viscosity pad fluid may comprise micro-proppant particulates in a concentration of about 0.05 ppg to about 0.5 ppg, or about 1 ppg to about 2 ppg, or about 3 ppg to about 5 ppg, and/or any value or range of values therein.

In certain embodiments, more than one pad fluid may be used to form a fracture network in a subterranean formation or portion thereof. In a non-limiting example, both a high viscosity pad fluid and a low viscosity pad fluid may be used in series to create and/or extend the fracture network. First, a high viscosity pad fluid comprising an aqueous base fluid, a gelling agent, a crosslinker, and a gel breaking agent may be introduced into the subterranean formation to create and/or extend the fracture network. Then, a low viscosity pad fluid comprising an aqueous base fluid, a friction reducing polymer, a friction reducer breaking agent, and a micro-proppant may be introduced. Without being limited by theory, it is believed the combination of the two fluids may allow for the high viscosity pad fluid to primarily create the fractures and branches and some microfractures, and the low viscosity pad fluid may create additional micro-fractures. Because the low viscosity pad fluid comprises micro-proppant particulates, the micro-proppant particulates may be initially placed in many of the micro-fractures. In certain embodiments, more than two pad fluids may be introduced into a subterranean formation in series to create and/or extend the fracture network and should not be limited herein. Any suitable sequence of pad fluids may be used and should not be limited herein.

Once the fracture network has been formed and/or extended, a low viscosity treatment fluid may be introduced into a fracture. Optionally, a low viscosity treatment fluid may be introduced into a pre-existing and/or naturally created fracture network. A low viscosity treatment fluid may comprise any suitable viscosity including, but not limited to, about 0.5 cP to about 1 cP, or about 1 cP to about 5 cP, or about 5 cP to about 20 cP, and/or any value or range of values therein.

In certain embodiments, the low viscosity treatment fluid may comprise an aqueous base fluid and proppant particulates. In certain embodiments, the low viscosity treatment fluid may comprise proppant particulates in an amount of about 0.25 ppg to about 0.5 ppg, or about 0.5 to about 1 ppg, or about 1 ppg to about 5 ppg, and/or any value or range of values therein. Any suitable proppant particulate may be used and should not be limited herein. Suitable proppant particulates may comprise a low-quality proppant particulates, a high-quality proppant particulates, the like, and/or any combinations thereof. In certain embodiments, the low viscosity treatment fluid may comprise low-quality proppant particulates. The low-quality proppant particulates may gravitationally migrate into a bottom portion of the fracture thereby forming a proppant pack, as the aqueous base fluid is allowed to flow out of the fracture. Under closure stress, the low-quality proppant particulates may be crushed thereby forming a full proppant pack in the bottom portion of the fracture. As used herein, "full proppant pack" may refer to a proppant pack that may substantially fill the bottom portion of the fracture and may comprise a permeability of about 0.1 Darcies to about 300 Darcies and a conductivity of about 0.1 mD-ft to about 5,000 mD-ft, and/or any value or range of values therein.

In certain embodiments, a series of low viscosity treatment fluids may be used to place high-quality proppant particulates in the near-wellbore region and low-quality proppant particulates within the bottom portion of the fracture to help ensure connectivity between the propped fracture and the wellbore. In a non-limiting example, a first low viscosity treatment fluid comprising a first aqueous base fluid and a first proppant particulate may be introduced into the fracture. In certain embodiments, the first proppant particulate may comprise a high-quality proppant particulate. The first proppant particulate may be present in the first low viscosity treatment fluid in an amount of about 2 wt. % to about 5 wt. %, or about 5 wt. % to about 10 wt. %, or about 10 wt. % to about 30 wt. % by weight of total proppant particulate placed in the bottom portion of the fracture, and/or any value or range of values therein. In certain embodiments, the first proppant particulate may be present in the first low viscosity treatment fluid in an amount of about 5 wt. % by weight of total proppant particulate placed in the bottom portion of the fracture or less.

Next, a second low viscosity treatment fluid comprising a second aqueous base fluid and a second proppant particulate may be introduced into the fracture. In certain embodiments, the second proppant particulate may comprise a low-quality proppant particulate. The second proppant particulate may be present in the second low viscosity treatment fluid in an amount of about 70 wt. % to about 80 wt. %, or about 80 wt. % to about 85 wt. %, or about 85 wt. % to about 98 wt. % by weight of total proppant particulate placed in the bottom portion of the fracture, and/or any value or range of values therein. In certain embodiments, the second proppant particulate may be present in the second low viscosity treatment fluid in an amount of about 85 wt. % by weight of total proppant particulate placed in the bottom portion of the fracture or greater.

Then, a third low viscosity treatment fluid comprising a third aqueous base fluid and a third proppant particulate may be introduced into the fracture. Any suitable third proppant particulate may be used and should not be limited herein. Suitable third proppant particulates may include, but are not limited to, high-quality proppant particulates, low-quality proppant particulates, the like, and/or any combinations thereof. The third proppant particulate may be present in the third low viscosity treatment fluid in an amount of about 1 wt. % to about 5 wt. %, or about 5 wt. % to about 10 wt. %, or about 10 wt. % to about 20 wt. % by weight of total proppant particulate placed in the bottom portion of the fracture, and/or any value or range of values therein. In certain embodiments, the third proppant particulate may be present in the third low viscosity treatment fluid in an amount of about 10 wt. % by weight of total proppant particulate placed in the bottom portion of the fracture or less.

Under closure stress, the high-quality proppant particulates and the low-quality proppant particulates may form a full mixed proppant pack in the bottom portion of the fracture. As used herein, "full mixed proppant pack" may refer to a proppant pack comprising low-quality proppant particulates and high-quality proppant particulates that may substantially fill the bottom portion of the fracture and may comprise a permeability of about 50 Darcies to about 300 Darcies and a conductivity of about 100 mD-ft to about 5,000 mD-ft, and/or any value or range of values therein.

Once proppant particulates have been placed in the bottom portion of the fracture, a post flush fluid may be introduced into the fracture. In certain embodiments, a post flush fluid may comprise an aqueous base fluid that may be substantially solids free. Any suitable post flush fluid capable of redistributing dunes throughout the fracture may be used. As used herein, "dunes" and/or "mounds" may refer to the build up of proppant particulates in the near-wellbore region of the uppermost surface of the full proppant pack or full mixed proppant pack formed in the bottom portion of a fracture. Dunes may also form at the interface between a fracture and a branch. Dunes may cause bridges that may restrict fluid flow through the fracture face and may screen out subsequently introduced proppant particulates.

After the dunes have been redistributed, a high viscosity treatment fluid may then be introduced into a top portion of the fracture. In certain embodiments, the high viscosity treatment fluid may comprise a suspension base fluid and proppant particulates. Any suitable proppant particulate may be used including, but not limited to, a high-quality high density proppant particulate, a low-quality low density proppant particulate, and/or any combinations thereof. In certain embodiments, the proppant particulate may comprise a density less than that of the suspension base fluid so as to provide sufficient suspension within the top portion of the fracture. In certain embodiments, the proppant particulate may comprise a density greater than that of the effective suspension fluid. The proppant particulates may be present in the high viscosity treatment fluid in any suitable concentration including, but not limited to, about 0.25 ppg to about 0.5 ppg, or about 0.5 ppg to about 2 ppg, or about 2 ppg to about 5 ppg, and/or any value or range of values therein. In certain embodiments, the proppant particulates may be evenly distributed throughout the high viscosity treatment fluid. In certain embodiments, the proppant particulates may be unevenly distributed throughout the high viscosity treatment fluid.

Any suitable proppant particulate capable of forming a partial proppant pack may be used. As used herein, "partial proppant pack" may refer to a high porosity pack of proppant particulates in a fracture, in which the proppant particulates may be widely spaced apart but may still be capable of holding the fracture open. Partial proppant packs may comprise interstitial spaces through which produced fluids may flow there through. Interstitial spaces may also be referred to as void channels and/or proppant-free channels. In certain embodiments, the average diameter of the proppant particulates may be directly related to the conductivity of the proppant pack. In a non-limiting example, as the average diameter of the proppant particulates increase, the conductivity of the proppant pack may increase. This may be because as the average diameter of the proppant particulate increases, the interstitial spaces through which produced fluids may flow there through may increase in size thereby allowing a larger volume of produced fluid to flow there through. As used herein, "high porosity" may refer to porosities equal to and/or greater than about 40%. In certain embodiments, a partial proppant pack may comprise a conductivity of about 10,000 mD-ft or greater.

In certain embodiments, the high viscosity treatment fluid may further comprise a bridging agent. Any suitable bridging agent capable of aiding in the lateral and vertical distribution and formation of partial proppant packs in the top portion of the fracture may be used. Bridging agents may include sized solid particulates capable of forming a bridge across the fractures of the exposed rock thereby creating a bridge in which proppant particulates may settle atop of thereby creating a partial proppant pack. In certain embodiments, proppant particulates may utilize gravity to settle atop of the created bridge. Any suitable amount of bridging agent may be present in the high viscosity treatment fluid including, but not limited to, about 0.1 wt. % to about 0.5 wt. %, or about 0.5 wt. % to about 3 wt. %, or about 3 wt. % to about 10 wt. % of the weight of proppant used in forming partial packs in the upper region of fracture, and/or any value or range of values therein. In certain embodiments, bridging agents may comprise densities similar to those of the proppant particulates present in the high viscosity treatment fluid. Optionally, bridging agents may be evenly distributed throughout the high viscosity treatment fluid.

Once the fracture is propped, pressure may be removed from the wellbore, the fracture may then undergo closure, and production may begin.

Figure 1:
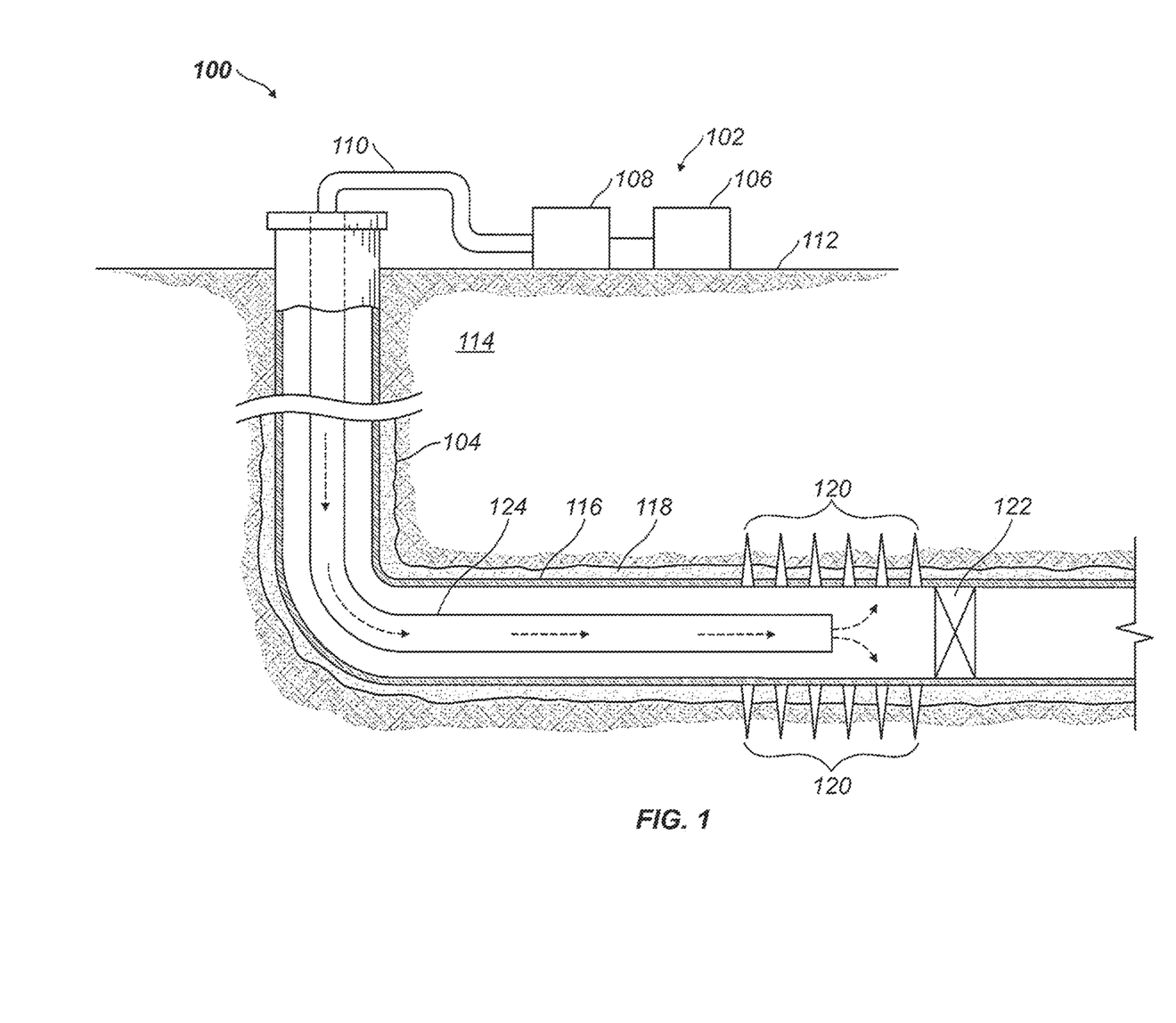
FIG. 1 is a drawing that illustrates a schematic view of a well system utilized for hydraulic fracturing.

Example methods of using the treatment fluids comprising proppant particulates may now be described in more detail with reference to FIG. 1. Any of the previous examples of the proppant particulates may apply in the context of FIG. 1. FIG. 1 illustrates an example well system 100 that may be used for preparation and delivery of a treatment fluid downhole. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure.

Referring now to FIG. 1, a fluid handling system 102 is illustrated. The fluid handling system 102 may be used for preparation of a treatment fluid including the multi-functional diverter particulate and for introduction of the treatment fluid into a wellbore 104. The fluid handling system 102 may include mobile vehicles, immobile installations, skids, hoses, tubes, fluid tanks or reservoirs, pumps, valves, and/or other suitable structures and equipment. As illustrated, the fluid handling system 102 may include a fluid supply vessel 106, pumping equipment 108, and wellbore supply conduit 110. While not illustrated, the fluid supply vessel 106 may contain one or more components of the treatment fluid (e.g., multi-functional diverter particulate particulates, base fluid, etc.) in separate tanks or other containers that may be mixed at any desired time. Pumping equipment 108 may be fluidically coupled with the fluid supply vessel 106 and wellbore supply conduit 110 to communicate the treatment fluid into wellbore 104. Fluid handling system 102 may also include surface and downhole sensors (not shown) to measure pressure, rate, temperature and/or other parameters of treatment. Fluid handling system 102 may also include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection of the treatment fluid. As depicted in FIG. 1, the fluid supply vessel 106 and pumping equipment 108 may be above the surface 112 while the wellbore 104 is below the surface 112. As will be appreciated by those of ordinary skill in the art, well system 100 may be configured as shown in FIG. 1 or in a different manner, and may include additional or different features as appropriate. By way of example, fluid handling system 102 may be deployed via skid equipment, marine vessel, or may be included of sub-sea deployed equipment.

Without continued reference to FIG. 1, well system 100 may be used for introduction of a treatment fluid into wellbore 104. The treatment fluid may contain a base fluid (which may be oil- or aqueous-based) and proppant particulates, described herein. Generally, wellbore 104 may include horizontal, vertical, slanted, curved, and other types of wellbore geometries and orientations. Without limitation, the treatment fluid may be applied through the well bore 104 to subterranean formation 114 surrounding any portion of wellbore 104. As illustrated, the wellbore 104 may include a casing 116 that may be cemented (or otherwise secured) to wellbore wall by cement sheath 118. Perforations 120 allow the treatment fluid and/or other materials to flow into and out of the subterranean formation 114. A plug 122, which may be any type of plug (e.g., bridge plug, etc.) may be disposed in wellbore 104 below the perforations 120 if desired. While FIG. 1 illustrates use of treatment fluid in a cased section of wellbore 104, it should be understood that treatment fluid may also be used in portions of wellbore 104 that are not cased.

The treatment fluid including the proppant particulates may be pumped from fluid handling system 102 down the interior of casing 116 in wellbore 104. As illustrated, well conduit 124 (e.g., coiled tubing, drill pipe, etc.) may be disposed in casing 116 through which the treatment fluid may be pumped. The well conduit 124 may be the same or different than the wellbore supply conduit 110. For example, the well conduit 124 may be an extension of the wellbore supply conduit 110 into the wellbore 104 or may be tubing or other conduit that is coupled to the wellbore supply conduit 110. The treatment fluid may be allowed to flow down the interior of well conduit 124, exit the well conduit 124, and finally enter subterranean formation 114 surrounding wellbore 104 by way of perforations 120 through the casing 116 (if the wellbore is cased as in FIG. 1) and cement sheath 118. Without limitation, the treatment fluid may be introduced into subterranean formation 114 whereby one or more fractures (not shown) may be created or enhanced in subterranean formation 114. For example, the treatment fluid may be introduced into subterranean formation 114 at or above a fracturing pressure. As previously, described, the treatment fluid including the proppant particulates may be placed into the subterranean formation 114 after a previous treatment has been performed such that additional locations in the subterranean formation 114 may be treated. Without limitation, at least a portion of the proppant particulate may be deposited in the subterranean formation 114.

Figure 2:
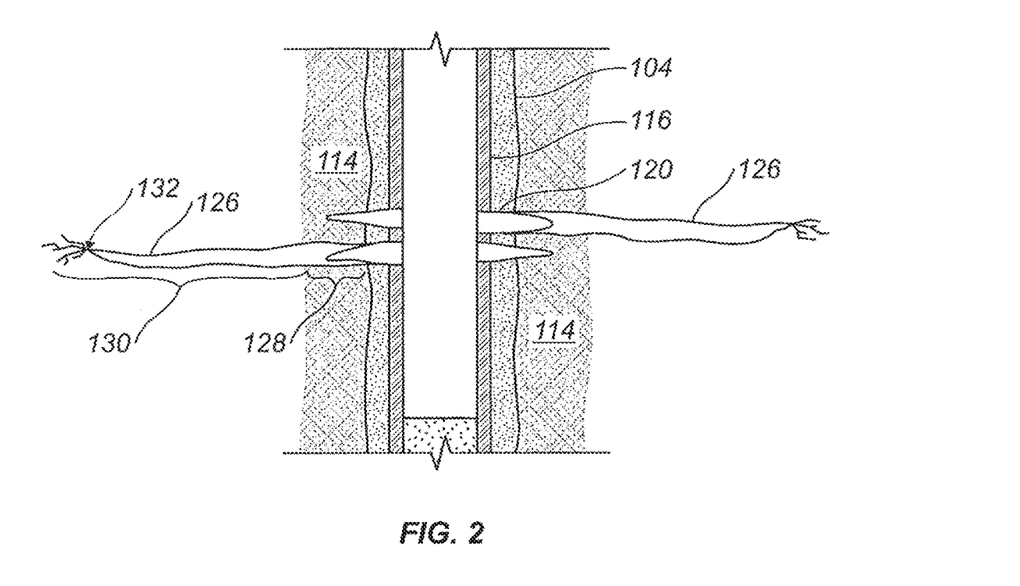
FIG. 2 is a drawing that illustrates an embodiment of a fractured wellbore.

The well treatment may include a fracturing treatment in which one or more fractures 126 may be created in subterranean formation 114. Referring now to FIG. 2, fracture 126 is shown extending from wellbore 104. Fracture 126 may comprise a near-wellbore region 128 and a far-wellbore region 130. As used herein, "near-wellbore region" may refer to the portion of a fracture that may be substantially adjacent or proximate to wellbore 104 and distal to fracture tip 132. As used herein, "far-wellbore region" may refer to the portion of a fracture distal to wellbore 104 and proximate to the fracture tip 132. The fracturing of the subterranean formation 114 may be accomplished using any suitable technique. By way of example, a fracturing treatment may include introducing a fracturing fluid into subterranean formation 114 at or above a fracturing pressure. The fracturing fluid may be introduced by pumping the fracturing fluid through casing 116, perforations 120, and into subterranean formation 114 surrounding wellbore 104. Alternatively, a jetting tool (not shown) may be used to initiate the fracture 126. The fracturing fluid may include proppant particulates which may be deposited within the fracture 126. A series of treatment fluids may be used to prop the fracture which may be discussed in greater detail below.

Figure 3:
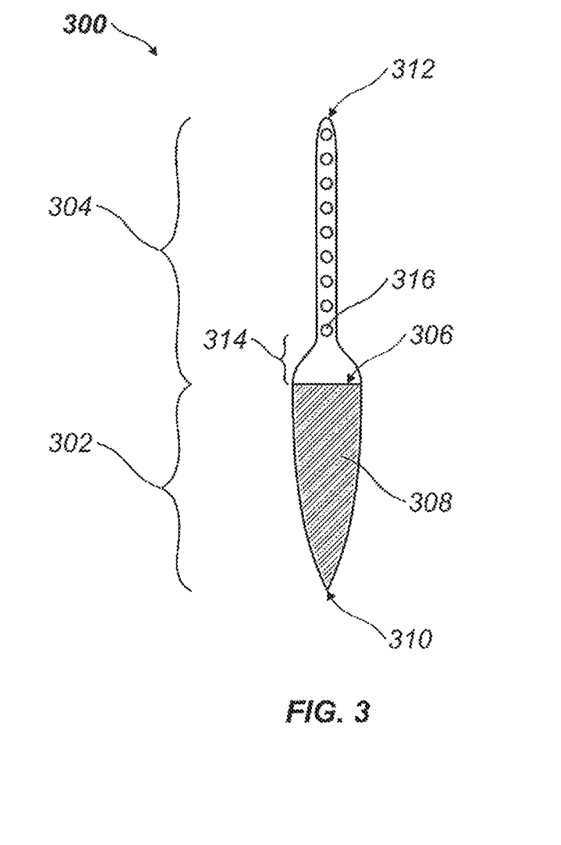
FIG. 3 is a drawing that illustrates a schematic view of a cross-sectional area of a fracture in a subterranean formation.

FIG. 3 illustrates an embodiment of a cross-sectional area of a fracture 300 in a subterranean formation. In certain embodiments, the fracture 300 may comprise a bottom portion 302 and a top portion 304. As used herein, a bottom portion 302 may refer to the area below the uppermost surface 306 of a formed full proppant pack 308 and above the base 310 of the fracture 300. The top portion 304 may refer to the area above the uppermost surface 306 of a formed full proppant pack 308 and below the apex 312 of the fracture 300. In certain embodiments, the fracture may comprise a void channel 314. As used herein, a void channel 314 may be any proppant-free channel within a fracture capable of providing a flow path through which produced fluids may flow from the subterranean formation 114 (referring to FIG. 2) to the wellbore 104 (referring to FIG. 2). In certain embodiments, a void channel 314 may be situated at any point above and/or adjacent to full proppant pack 308 within fracture 300. Void channel 314 may greatly increase the conductivity of the propped fracture 300. In certain embodiments, partial proppant packs 316 may be formed adjacent to the full proppant pack 308 within a portion of the fracture 300. In certain embodiments, partial proppant pack 316 may be formed in a portion of the wellbore aloft the full proppant pack 308.

Figure 4A:
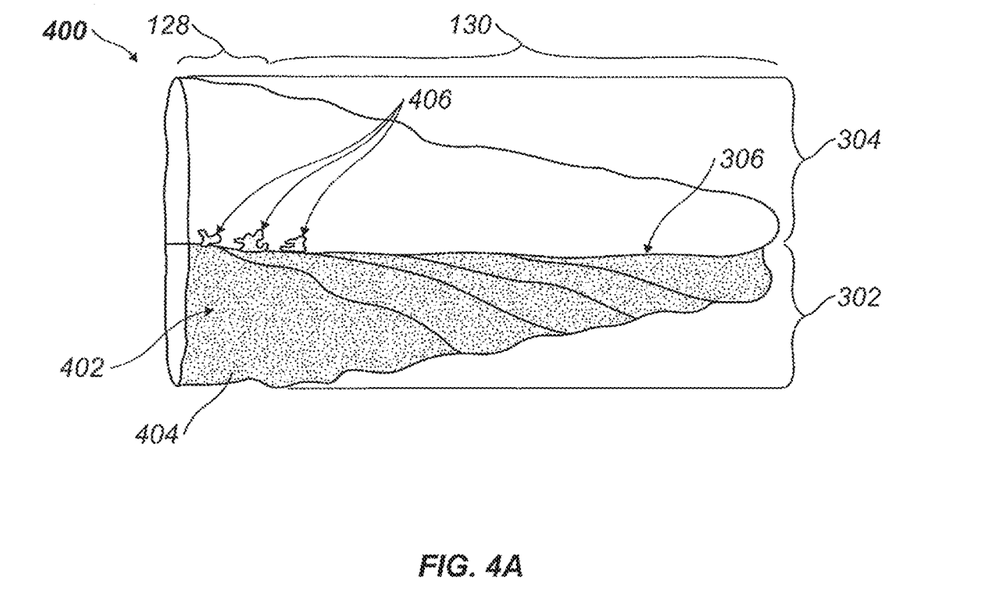
FIGS. 4a and 4b are drawings that illustrate a schematic of a cross-sectional side view of a fracture in a subterranean formation.
Figure 4B:
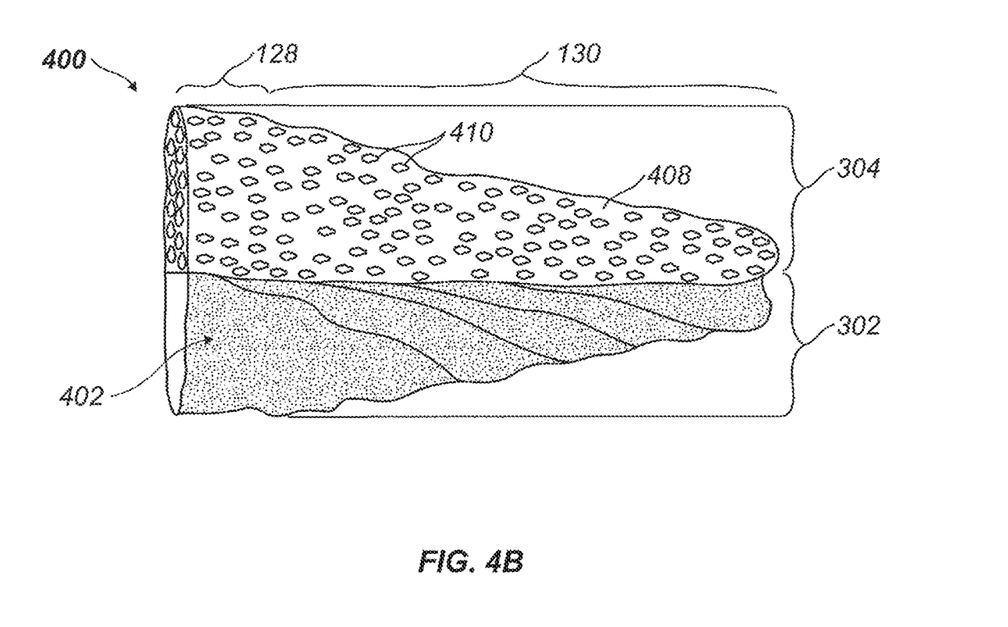

FIGS. 4a and 4b illustrate a schematic of a cross-sectional side view of an alternative embodiment of a fracture 400 in a subterranean formation. Full proppant pack 402 may be formed in the bottom portion 302 of fracture 400. The full proppant pack 402 may comprise proppant particulates 404. Referring to FIG. 4a, as proppant particulates 404 are placed in fracture 400 to form full proppant pack 402, dunes 406 may form in the near-wellbore region 128 adjacent to the uppermost surface 306 of full proppant pack 402 formed in fracture 400. Dunes 406 may reduce the conductivity of fracture 400 and may negatively affect production of the formation. A solids free post flush fluid may be introduced into fracture 400 and may redistribute dunes 406 throughout the length of fracture 400. Referring now to FIG. 4b. After dunes 406 have been redistributed, a high viscosity treatment fluid (not shown) may be introduced into the top portion 304 adjacent to the full proppant pack 402 within fracture 400. The high viscosity treatment fluid may comprise an suspension base fluid 408 and proppant particulates (not shown). In certain embodiments, proppant particulates may form partial proppant packs 410 in the upper portion of the wellbore. Full proppant pack 402 and partial proppant packs 410 may vary in the type of proppant particulate, the quality of proppant particulate, the size of proppant particulate, conductivity, and permeability. With the benefit of the present disclosure, one of ordinary skill in the art may be able to determine the appropriate types, qualities, and sizes of proppant particulates required to form the desired full proppant pack 402 and the desired partial proppant pack 410 and should not be limited herein.

Figure 5:
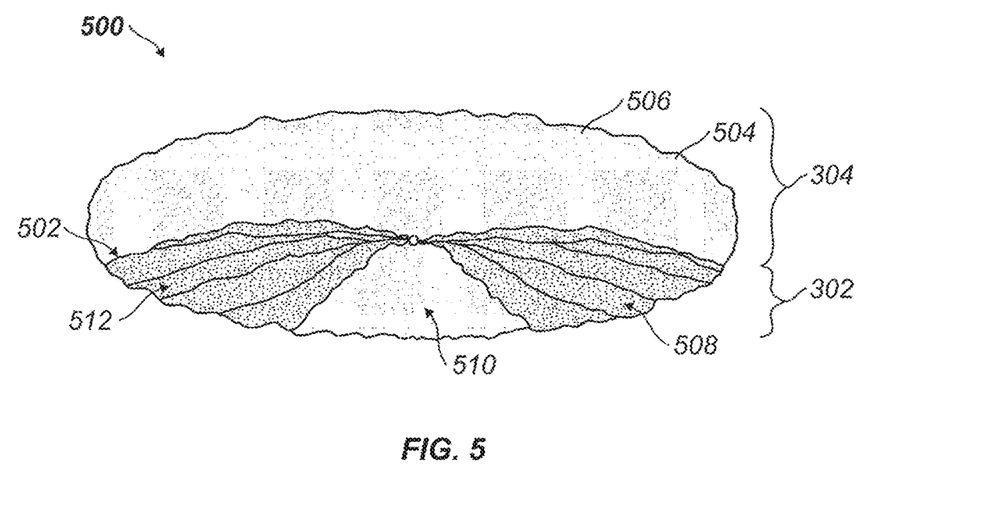
FIG. 5 is a drawing that illustrates a schematic of a cross-sectional side view of a fracture in a subterranean formation.

FIG. 5 illustrates a schematic of a cross-sectional side view of an alternative embodiment of a fracture 500 in a subterranean formation. Fracture 500 may comprise a full mixed proppant pack 502, a suspension base fluid 504, and partial proppant packs 506. Full mixed proppant pack 502 may comprise high-quality proppant particulates 508, 512 and low-quality proppant particulates 510. Sequentially, high-quality proppant particulates 508 may be placed in fracture 500, then low-quality proppant particulates 512 may be placed in fracture 500, then high-quality proppant particulates 512 may be placed in the fracture. In certain embodiments, the low-quality proppant particulates 508 comprise about 70% by weight or greater of the full mixed proppant pack 502. Full mixed proppant pack 502 and partial proppant packs 506 may vary in the type of proppant particulate, the quality of proppant particulate, the size of proppant particulate, conductivity of the formed proppant pack, and permeability of the formed proppant pack. Along with the present disclosure, one of ordinary skill in the art may be able to determine the appropriate types, qualities, and sizes of proppant particulates required to form the desired full mixed proppant pack 502 and the desired partial proppant pack 506 and should not be limited herein.

Figure 6:
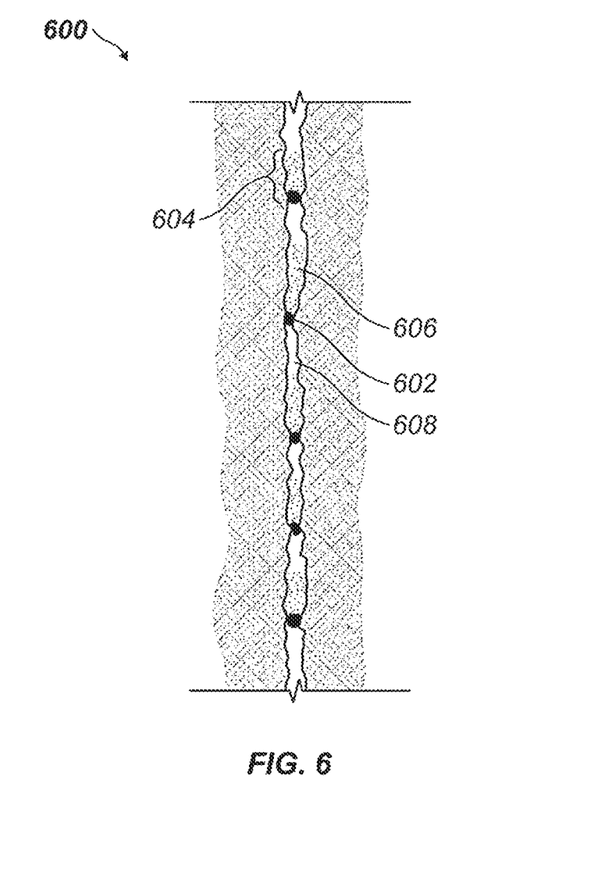
FIG. 6 is a drawing that illustrates a schematic of a propped top portion of a fracture in a subterranean formation comprising a bridging agent.

FIG. 6 illustrates a schematic of an alternative embodiment of a propped top portion of a fracture 600 in a subterranean formation comprising a bridging agent. Any suitable bridging agent capable of aiding in the lateral and vertical distribution and formation of partial proppant packs 604 in the propped top portion of the fracture 600 may be used. Bridging agents may include sized solid particulates capable of forming a bridge 602 across the fractures of the exposed rock thereby creating a bridge 602 in which proppant particulates 606 may settle atop of thereby creating a partial proppant pack 604. Void channels 608 may be created adjacent to the partial proppant pack 604 or adjacent to a plurality of partial proppant packs 604 and may greatly increase the conductivity of the propped top portion of the fracture 600. In certain embodiments, void channels 608 may be adjacent to a full proppant pack (not shown).

Accordingly, this disclosure describes compositions, methods, and systems, that may use the disclosed sequence of treatment fluids. The compositions, methods, and systems may include any of the following statements.

Statement 1: A method for treating a subterranean formation, the method comprising: injecting a pad fluid into the subterranean formation at a pressure sufficient to create at least one fracture in the subterranean formation; injecting a first treatment fluid into the at least one fracture, wherein the first treatment fluid comprises: an aqueous base fluid, and a first proppant particulate; allowing the first proppant particulate to gravitationally migrate into a portion of the at least one fracture; injecting a second treatment fluid into the at least one fracture, wherein the second treatment fluid comprises: a suspension base fluid comprising a viscosity of about 50 cP to about 10,000 cP, and a second proppant particulate; and allowing the fracture to close, thereby forming a full proppant pack and a partial proppant pack in the at least one fracture.

Statement 2: The method of statement 1, further comprising injecting a post-flush fluid into the at least one fracture.

Statement 3: The method of statement 1 or 2, wherein the pad fluid, the first treatment fluid, the post-flush fluid, and the second treatment fluid are introduced into the at least one fracture sequentially.

Statement 4: The method of any of the preceding statements, wherein the density of the first proppant particulate is greater than the density of the first aqueous base fluid, and wherein the density of the first proppant particulate is about 1.1 $g/cm^3$ to about 4.0 $g/cm^3$.

Statement 5: The method of any of the preceding statements, wherein the density of the second proppant particulate is about 0.9 $g/cm^3$ to about 4 $g/cm^3$.

Statement 6: The method of any of the preceding statements, wherein the first proppant particulate comprises a low-quality proppant particulate, wherein the first proppant particulate comprises a crush strength of about 500 psi to about 2,500 psi.

Statement 7: The method of any of the preceding statements, wherein the partial proppant pack comprises a greater conductivity than the full proppant pack.

Statement 8: The method of any of the preceding statements, wherein the conductivity of the full proppant pack is about 0.1 mD-ft to about 5,000 mD-ft.

Statement 9: The method of any of the preceding statements, wherein the conductivity of the partial proppant pack is about 10,000 mD-ft or greater.

Statement 10: A method for treating a subterranean formation, the method comprising: creating at least one primary fracture and at least one micro-fracture; injecting a first treatment fluid comprising a first proppant particulate and a first aqueous base fluid having a viscosity of about 1 cP to about 20 cP; injecting a second treatment fluid comprising a second proppant particulate and a suspension base fluid comprising a viscosity of about 20 cP to about 20,000 cP, wherein the second proppant particulate is suspended within the suspension base fluid; and allowing the fracture to close.

Statement 11: The method of statement 10, wherein creating the at least one primary fracture and the at least one micro-fracture further comprises: injecting a high-viscosity pad fluid into the subterranean formation at a rate sufficient to create one or more primary fractures, wherein the high-viscosity pad fluid has a viscosity of about 50 cP to about 10,000 cP; and injecting a low-viscosity pad fluid into the subterranean formation at a rate sufficient to generate at least one or more micro-fractures along the length of the one or more primary fractures, wherein the low-viscosity pad fluid comprises: a second aqueous base fluid, a micro-proppant particulate, and wherein the low-viscosity pad fluid comprises a viscosity of about 0.1 cP to about 20 cP.

Statement 12: The method of statement 10 or 11, further comprising: allowing the first proppant particulate to gravitationally migrate within a portion of the one or more primary fractures thereby forming a full proppant pack, wherein the full proppant pack comprises a conductivity of about 0.1 mD-ft to about 5,000 mD-ft.

Statement 13: The method of any of the preceding statements, further comprising: forming a partial proppant pack comprising the second proppant particulates adjacent to the full proppant pack within a portion of the one or more primary fractures, wherein the partial proppant pack comprises a conductivity of about 10,000 mD-ft or greater.

Statement 14: The method of any of the preceding statements, wherein the first proppant particulate comprises a density of about 0.9 g/cc to about 2.65 g/cc, and wherein the second proppant particulate comprises a density of about 2.5 g/cc to about 4.0 g/cc.

Statement 15: The method of any of the preceding statements, wherein the second treatment fluid further comprises non-degradable particulates.

Statement 16: A method for treating a subterranean formation, the method comprising: creating a fracture network within the subterranean formation; injecting a first treatment fluid comprising a first aqueous base fluid and a first proppant particulate; injecting a second treatment fluid comprising a second aqueous base fluid and a second proppant particulate; injecting a third fluid comprising a third aqueous base fluid and a third proppant particulate; allowing the first proppant particulate, the second proppant particulate, and the third proppant particulate to gravitationally migrate sequentially within a portion of the fracture network thereby forming a full mixed proppant pack; injecting a fourth treatment fluid comprising a fourth proppant particulate into the fracture network; and allowing the fourth proppant particulate to form a partial proppant pack adjacent to the full mixed proppant pack within the portion of the fracture network.

Statement 17: The method of statement 16, wherein the first treatment fluid, the second treatment fluid, the third treatment fluid, and the fourth treatment fluid are sequentially injected into the portion of the fracture network.

Statement 18: The method of statement 16 or 17, wherein the first proppant particulate and the third proppant particulate comprise about 10 wt. % by weight or more of the full mixed proppant pack.

Statement 19: The method of any of statements 16 to 18, wherein the first proppant particulate comprises a crush strength of about 2,000 psi to about 20,000 psi, wherein the second proppant particulate comprises a crush strength of about 100 psi to about 2,000 psi, wherein the third proppant particulate comprises a crush strength of about 100 psi to about 2,000 psi and a density of about 0.9 g/cc to about 2.65 g/cc.

Statement 20: The method of any of statements 16 to 19, wherein the fourth treatment fluid further comprises a suspension base fluid comprising a viscosity of about 50 cP to about 10,000 cP, wherein the fourth proppant particulate is present in the suspension base fluid in an amount of about 5 wt. % to about 10 wt. % of the full mixed proppant pack.

To facilitate a better understanding of the present disclosure, the following examples of certain aspects of some of the systems and methods are given. In no way should the following examples be read to limit, or define, the entire scope of the disclosure.

EXAMPLE

A numerical simulation study was performed to determine the impact of improving conductivity of an unpropped section in the upper side of the induced fracture that may have on the production of produced fluids. The study utilized a fracture with a height of about 200 ft and a fracture length of about 250 ft. The study assumed that there was not residual conductivity in an unpropped fracture. The study also assumed that settled proppant particulates form a tight proppant pack within the bottom portion of the induced fracture and no void or channel exists on top of the settled proppant pack. Another assumption made was that 40/70 mesh proppant pack had a conductivity of about 300 mD-ft at a closure stress of about 2,000 psi. Table 1 demonstrates the cumulative gas productions and the percentage of improved production from a propped fracture for various levels of settled proppant particulates corresponding to the improved conductivity over the unpropped fracture section with is assumed to have no conductivity.

TABLE 1

Gas Production- Effects of Settled Proppant and Improved Conductivity of Unpropped Section

| % of the height of the top portion of the fracture that is NOT propped | Vol. of Produced Fluids with No Residual Conductivity Through the Top Portion of the Fracture (MSCF) | Vol. of Produced Fluids with Conductivity of 0.14 mD-ft Through the Top Portion of the Fracture (MSCF) | Improved Production (%) | Vol. of Produced Fluids with Conductivity of 1.4 mD-ft Through the Top Portion of the Fracture (MSCF) | Improved Production (%) | Vol. of Produced Fluids with Conductivity of 14 mD-ft Through the Top Portion of the Fracture (MSCF) | Improved Production (%) |
|---|---|---|---|---|---|---|---|
| 0% | 87,850 | 87,850 | 0 | 87,850 | 0 | 87,850 | 0 |
| 20% | 71,300 | 77,700 | 9 | 84,600 | 19 | 87,500 | 23 |
| 40% | 54,500 | 67,400 | 24 | 81,300 | 49 | 87,000 | 60 |
| 60% | 37,700 | 57,150 | 51 | 78,000 | 107 | 86,600 | 130 |
| 80% | 20,900 | 46,800 | 124 | 74,600 | 258 | 86,000 | 313 |

Table 2 demonstrates the cumulative oil productions and the percentage of improved production from propped fracture for various levels of settled proppant particulates corresponding to the improved conductivity over the unpropped fracture section with is assumed to have no conductivity.

TABLE 2

Oil Production- Effects of Settled Proppant and Improved Conductivity of Unpropped Section

| % of the height of the top portion of the fracture that is NOT propped | Vol. of Produced Fluids with No Residual Conductivity Through the Top Portion of the Fracture (Bbls) | Vol. of Produced Fluids with Conductivity of 0.14 mD-ft Through the Top Portion of the Fracture (Bbls) | Improved Production (%) | Vol. of Produced Fluids with Conductivity of 1.4 mD-ft Through the Top Portion of the Fracture (Bbls) | Improved Production (%) | Vol. of Produced Fluids with Conductivity of 14 mD-ft Through the Top Portion of the Fracture (Bbls) | Improved Production (%) |
|---|---|---|---|---|---|---|---|
| 0% | 31,100 | 31,100 | 0.0 | 31,100 | 0.0 | 31,100 | 0.0 |
| 20% | 28,700 | 28,800 | 0.4 | 29,200 | 1.7 | 30,300 | 5.6 |
| 40% | 24,400 | 24,800 | 1.6 | 26,100 | 7.0 | 29,200 | 20.0 |
| 60% | 19,800 | 20,400 | 3.4 | 22,700 | 15.0 | 27,900 | 41.0 |
| 80% | 14,800 | 15,400 | 4.0 | 18,400 | 24.0 | 25,900 | 75.0 |

As demonstrated in the above examples, as the percentage of proppant in the top portion of the fracture increases, the conductivity increases, and the overall percentage of produced fluid through the fracture increases.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for treating a subterranean formation, the method comprising:
    injecting a pad fluid into the subterranean formation at a pressure sufficient to create at least one fracture in the subterranean formation;
    injecting a first treatment fluid into the at least one fracture, wherein the first treatment fluid comprises:
        an aqueous base fluid comprising a viscosity of about 0.25 cP to about 20 cP, and
        a first proppant particulate;
    allowing the first proppant particulate to gravitationally migrate into a bottom portion of the at least one fracture,
        wherein about 5% to about 30% by weight of total first proppant particulate in the bottom portion of the at least one fracture comprises a density of about 2.7 g/cc to about 4.0 g/cc and a crush strength of about 2,000 psi to about 20,000 psi,
        wherein a portion of the first proppant forms dunes after gravitationally migrating into the bottom portion of the at least one fracture;
    injecting a post flush fluid capable of redistributing the formed dunes throughout the bottom portion of the at least one fracture;
    injecting a second treatment fluid into the at least one fracture, wherein the second treatment fluid comprises:
        a suspension base fluid comprising a viscosity of about 50 cP to about 10,000 cP, and
        a second proppant particulate, wherein the second proppant particulate comprises a crush strength of about 2,000 psi to about 20,000 psi; and
    allowing the fracture to close, thereby forming a full proppant pack in the bottom portion of the at least one fracture and a partial proppant pack in a top portion of the at least one fracture.

2. The method of claim 1, wherein the pad fluid, the first treatment fluid, the post-flush fluid, and the second treatment fluid are introduced into the at least one fracture sequentially.

3. The method of claim 1, wherein about 70% to about 95% by weight of total first proppant particulate in the bottom portion of the at least one fracture comprises a density of about 0.9 g/cm³ to about 2.6 g/cm³.

4. The method of claim 1, wherein the density of the second proppant particulate is about 2.7 g/cm³ to about 4 g/cm³.

5. The method of claim 1, wherein about 70% to about 95% by weight of total proppant in the bottom portion of the at least one fracture comprises a crush strength of about 100 psi to about 2,000 psi.

6. The method of claim 1, wherein the partial proppant pack comprises a greater conductivity than the full proppant pack.

7. The method of claim 1, wherein the conductivity of the full proppant pack is about 0.1 mD-ft to about 5,000 mD-ft.

8. The method of claim 1, wherein the conductivity of the partial proppant pack is about 10,000 mD-ft or greater.

9. A method for treating a subterranean formation, the method comprising:
creating at least one primary fracture and at least one micro-fracture;
injecting a first treatment fluid comprising a first proppant particulate and a first aqueous base fluid having a viscosity of about 1 cP to about 20 cP;
allowing the first proppant particulate to gravitationally migrate into a bottom portion of the at least one fracture, wherein a portion of the first proppant forms dunes after gravitationally migrating into the bottom portion of the at least one fracture;
injecting a post flush fluid capable of redistributing the formed dunes throughout the bottom portion of the at least one fracture;
injecting a second treatment fluid comprising a second proppant particulate and a suspension base fluid comprising a viscosity of about 20 cP to about 20,000 cP, wherein the second proppant particulate is suspended within the suspension base fluid; and
allowing the fracture to close.

10. The method of claim 9, wherein creating the at least one primary fracture and the at least one micro-fracture further comprises:
injecting a high-viscosity pad fluid into the subterranean formation at a rate sufficient to create one or more primary fractures, wherein the high-viscosity pad fluid has a viscosity of about 50 cP to about 10,000 cP; and
injecting a low-viscosity pad fluid into the subterranean formation at a rate sufficient to generate at least one or more micro-fractures along the length of the one or more primary fractures, wherein the low-viscosity pad fluid comprises:
a second aqueous base fluid,
a micro-proppant particulate, and
wherein the low-viscosity pad fluid comprises a viscosity of about 0.1 cP to about 20 cP.

11. The method of claim 9, further comprising:
allowing the first proppant particulate to gravitationally migrate within a portion of the one or more primary fractures thereby forming a full proppant pack,
wherein the full proppant pack comprises a conductivity of about 0.1 mD-ft to about 5,000 mD-ft.

12. The method of claim 11, further comprising:
forming a partial proppant pack comprising the second proppant particulates adjacent to the full proppant pack within a portion of the one or more primary fractures, wherein the partial proppant pack comprises a conductivity of about 10,000 mD-ft or greater.

13. The method of claim 9, wherein the first proppant particulate comprises a density of about 0.9 g/cc to about 2.65 g/cc, and wherein the second proppant particulate comprises a density of about 2.5 g/cc to about 4.0 g/cc.

14. The method of claim 13, wherein the second treatment fluid further comprises non-degradable particulates.

15. A method for treating a subterranean formation, the method comprising:
creating a fracture network within the subterranean formation;
injecting a first treatment fluid comprising a first aqueous base fluid and a first proppant particulate, wherein the first aqueous base fluid has a viscosity of about 0.25 cP to about 20 cP;
injecting a second treatment fluid comprising a second aqueous base fluid and a second proppant particulate;
injecting a third fluid comprising a third aqueous base fluid and a third proppant particulate;
allowing the first proppant particulate, the second proppant particulate, and the third proppant particulate to gravitationally migrate sequentially within a portion of the fracture network thereby forming a full mixed proppant pack,
wherein about 5% to about 30% by weight of total first proppant particulate in the full mixed proppant pack comprises a density of about 2.7 g/cc to about 4.0 g/cc and a crush strength of about 2.000 psi to about 20.000 psi;
injecting a fourth treatment fluid comprising a fourth proppant particulate into the fracture network; and
allowing the fourth proppant particulate to form a partial proppant pack adjacent to the full mixed proppant pack within the portion of the fracture network.

16. The method of claim 15, wherein the first treatment fluid, the second treatment fluid, the third treatment fluid, and the fourth treatment fluid are sequentially injected into the portion of the fracture network.

17. The method of claim 16, wherein the first proppant particulate and the third proppant particulate comprise about 10 wt. % by weight or more of the full mixed proppant pack.

18. The method of claim 15, wherein the second proppant particulate comprises a crush strength of about 100 psi to about 2,000 psi, wherein the third proppant particulate comprises a crush strength of about 100 psi to about 2,000 psi and a density of about 0.9 g/cc to about 2.65 g/cc.

19. The method of claim 15, wherein the fourth treatment fluid further comprises a suspension base fluid comprising a viscosity of about 50 cP to about 10,000 cP, wherein the fourth proppant particulate is present in the suspension base fluid in an amount of about 5 wt. % to about 10 wt. % of the full mixed proppant pack.

* * * * *